(12) United States Patent
Ayats et al.

(10) Patent No.: US 7,462,289 B2
(45) Date of Patent: Dec. 9, 2008

(54) DISPENSER FOR A TABLET, AND METHODS OF USE

(75) Inventors: Francesc Ayats, Barcelona (ES); David Augustus Chang, Chestnut Ridge, NY (US); Jay Packman, Suffern, NY (US)

(73) Assignee: Reckitt Benckiser Inc., Parsippany, NJ (US)

( * ) Notice: Subject to any disclaimer, the term of this patent is extended or adjusted under 35 U.S.C. 154(b) by 0 days.

(21) Appl. No.: 11/813,739

(22) PCT Filed: Jan. 11, 2006

(86) PCT No.: PCT/GB2006/000096

§ 371 (c)(1),
(2), (4) Date: Jul. 11, 2007

(87) PCT Pub. No.: WO2006/075157

PCT Pub. Date: Jul. 27, 2006

(65) Prior Publication Data

US 2008/0067134 A1    Mar. 20, 2008

Related U.S. Application Data

(60) Provisional application No. 60/643,208, filed on Jan. 12, 2005, provisional application No. 60/664,130, filed on Mar. 22, 2005.

(51) Int. Cl.
*C02F 1/68* (2006.01)
*E03B 11/00* (2006.01)
*B08B 3/00* (2006.01)

(52) U.S. Cl. ............... 210/749; 210/198.1; 210/206; 210/753; 210/754; 210/199; 137/268; 134/93; 422/282

(58) Field of Classification Search ............... 210/749, 210/753, 754, 198.1, 199, 206, 254, 255, 210/248; 137/268; 134/93; 422/261, 278, 422/279, 282; 239/193, 310, 316, 317, 379
See application file for complete search history.

(56) References Cited

U.S. PATENT DOCUMENTS

| 3,121,236 A | 2/1964 | Yadro et al. |
| 4,216,027 A | 8/1980 | Wages |
| 4,375,109 A | 3/1983 | Jones et al. |
| 4,453,278 A | 6/1984 | Doggett et al. |
| 5,125,577 A * | 6/1992 | Frankel ............ 239/211 |
| 6,553,894 B1 | 4/2003 | Hamon et al. |

* cited by examiner

*Primary Examiner*—Matthew O. Savage
*Assistant Examiner*—Lucas Stelling
(74) *Attorney, Agent, or Firm*—Norris McLaughlin & Marcus, PA

(57) ABSTRACT

The present invention relates to improved dispensers for a tablet containing or consisting of a dissolvable composition which, when contacted with water, will elute one or more chemical compounds to the water. More particularly the present invention relates to such an improved dispenser for a tablet which according to one aspect of the invention is particularly useful with, or forms a part of a device for the treatment of water, particularly a device useful in the purification of water.

8 Claims, 5 Drawing Sheets

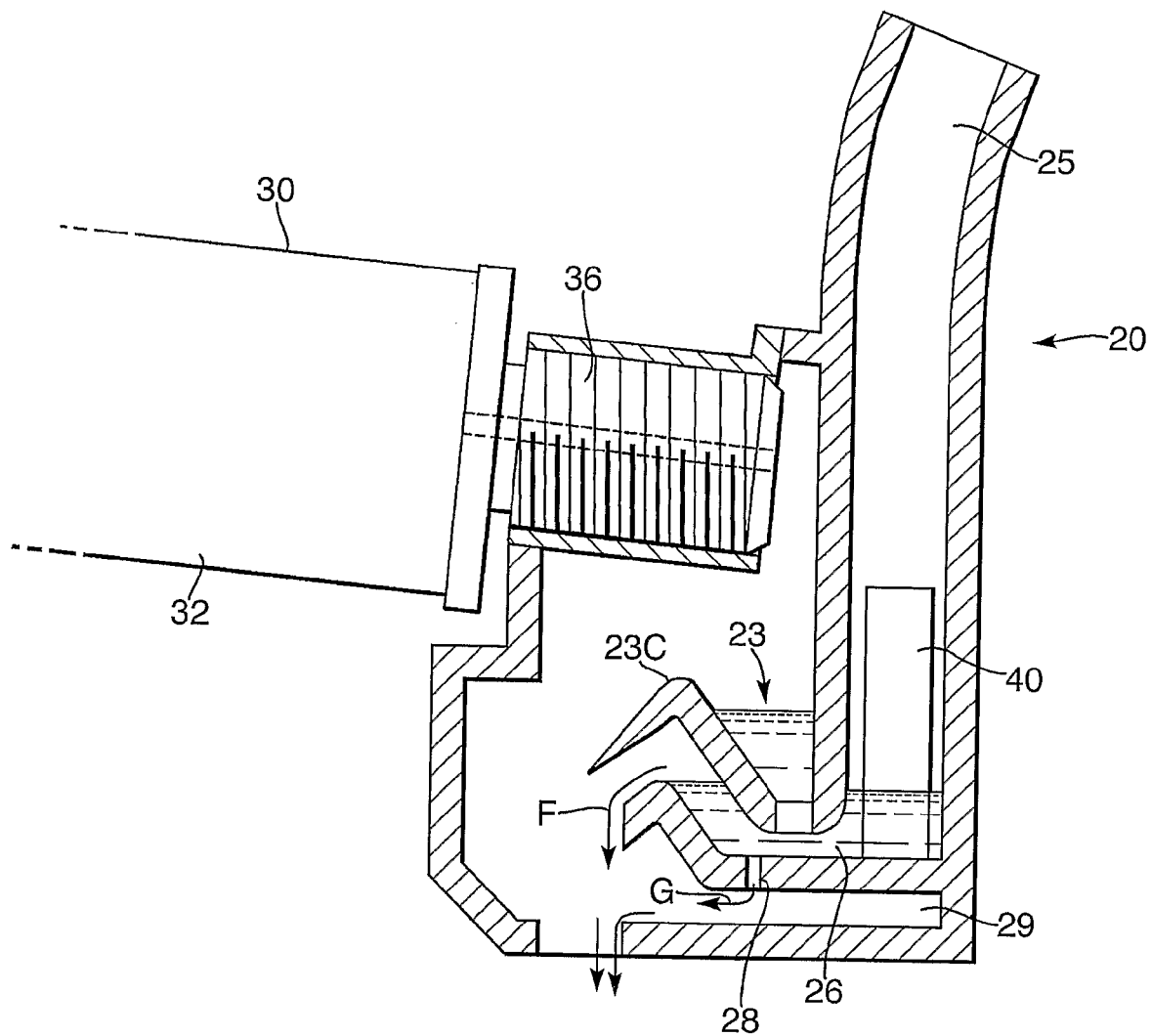

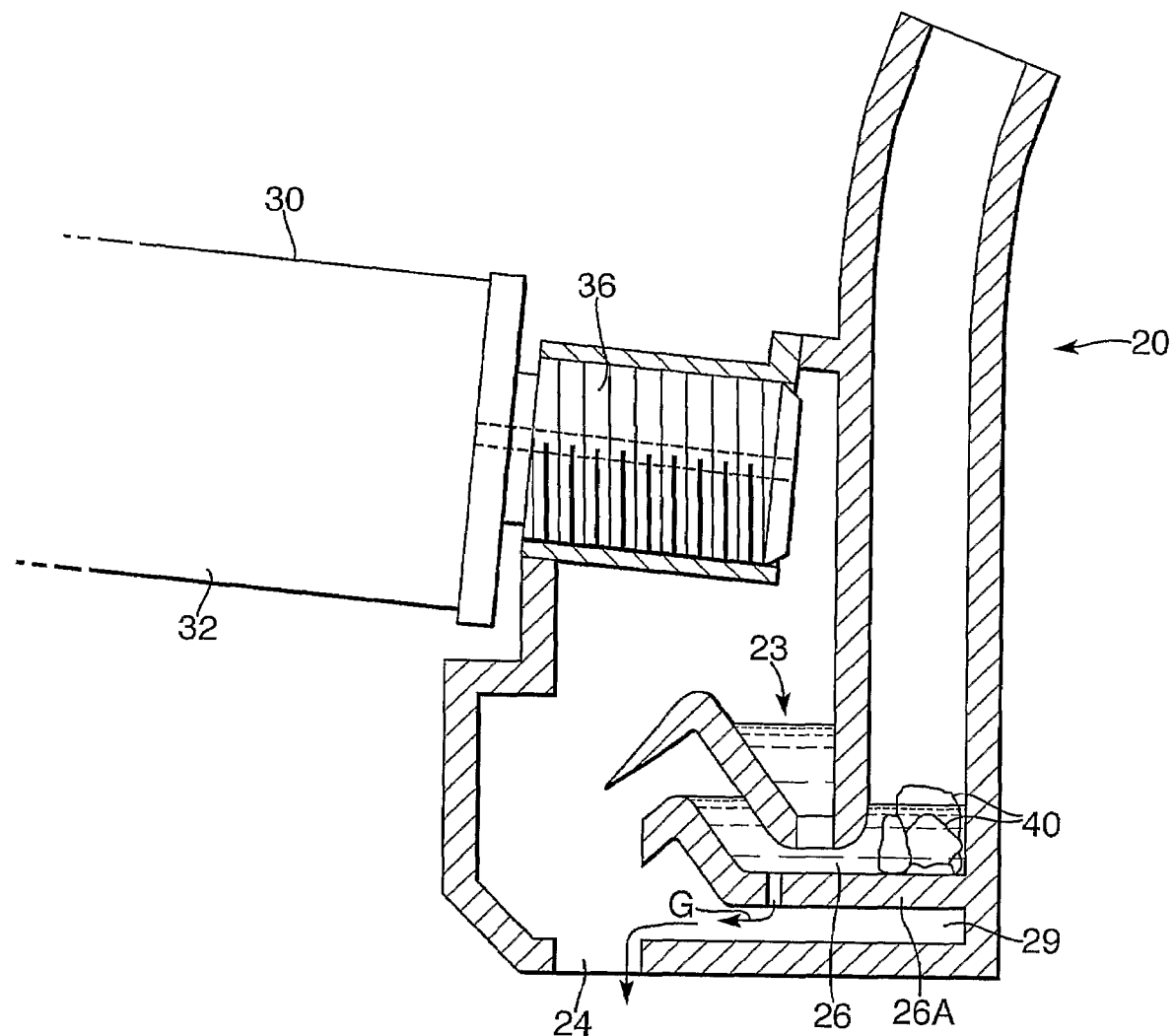

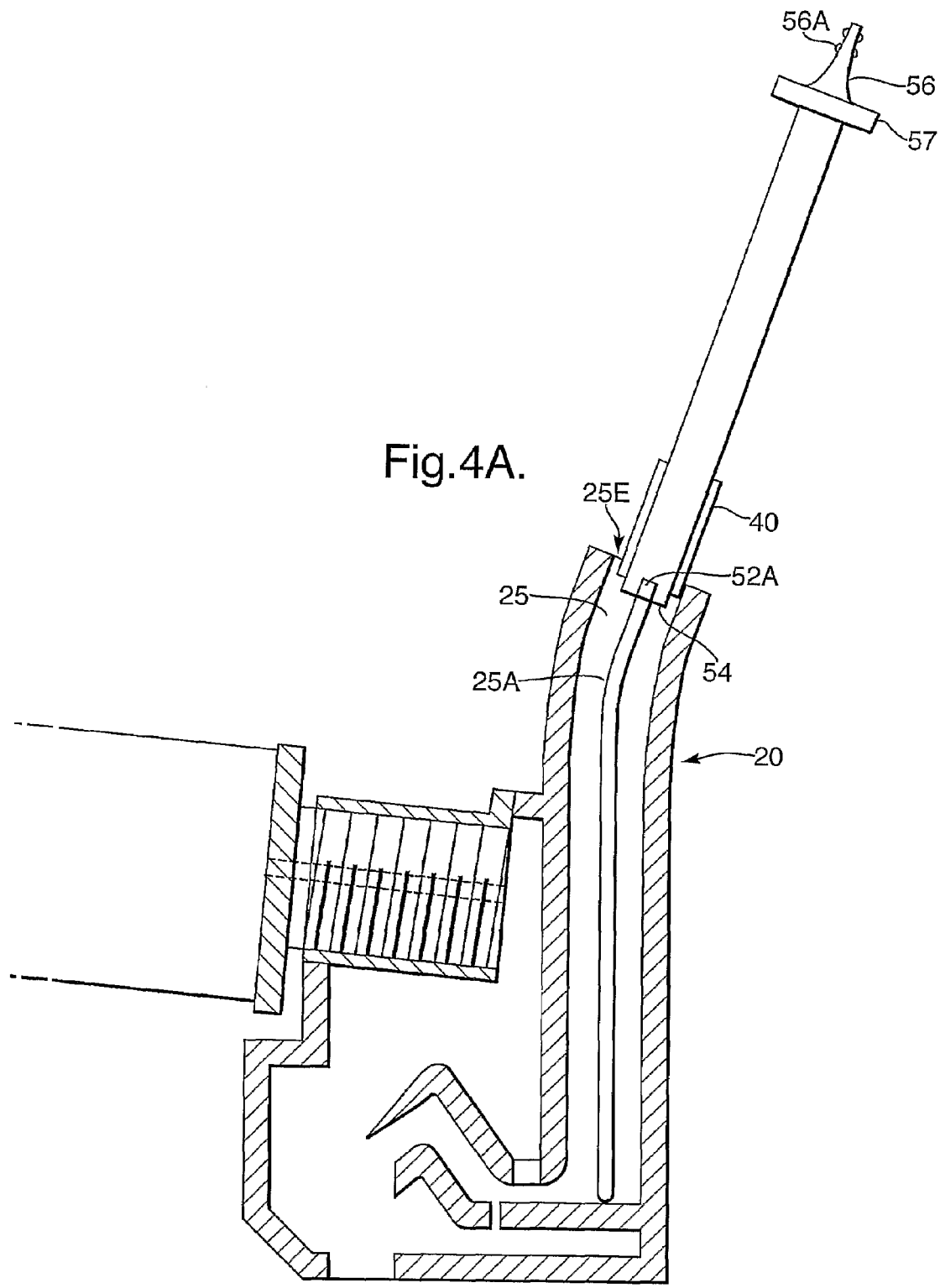

DISPENSER FOR A TABLET, AND METHODS OF USE

Figure 1:
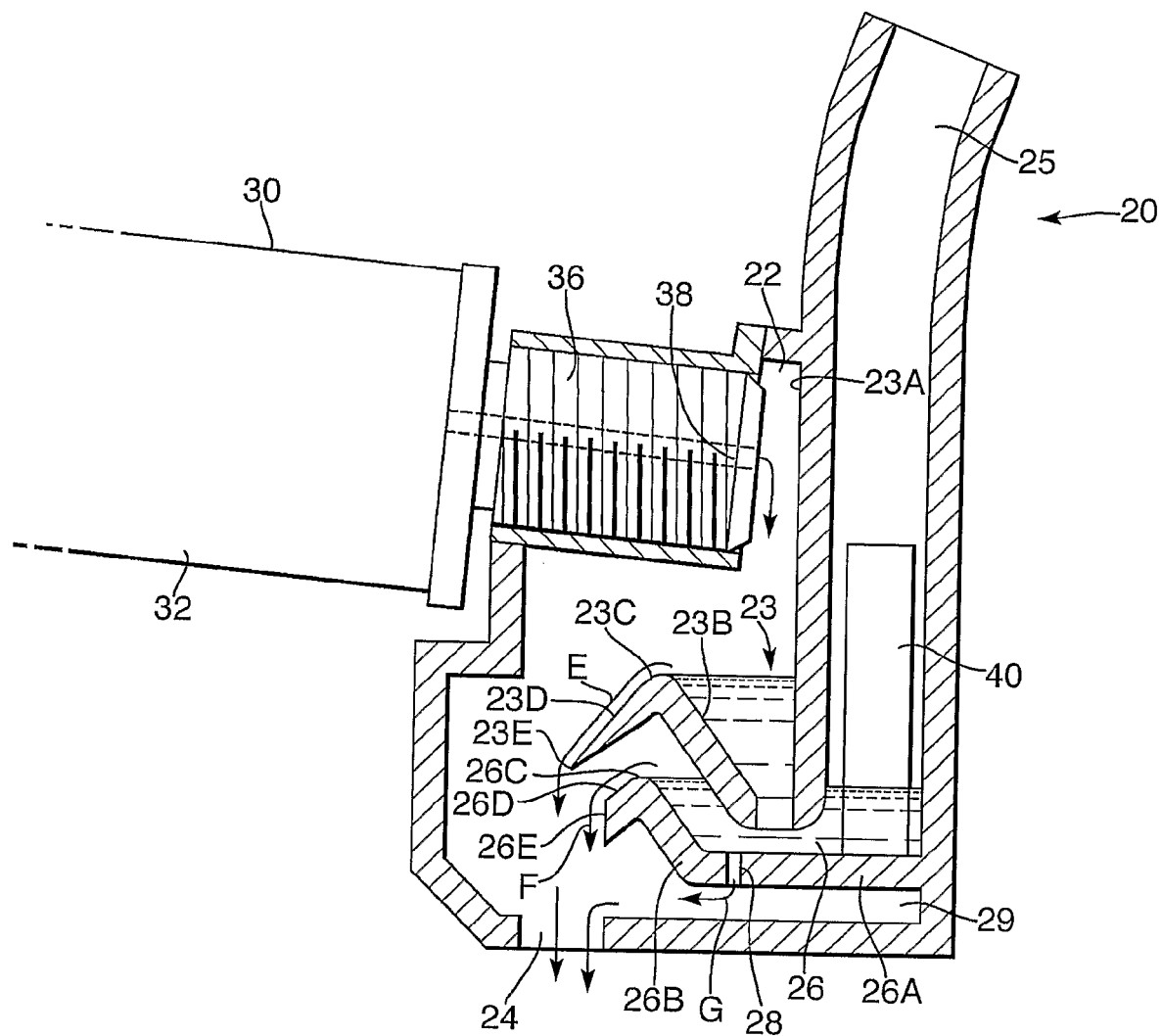

This is an application filed under 35 USC 371 of PCT/GB2006/000096.

The present invention relates to improved dispensers for a tablet containing or consisting of a chemical composition which, when contacted with a liquid such as water or other liquid, will elute one or more chemical compounds to said liquid.

The unavailability of safe, sanitary water ("potable water") suitable for human consumption is a problem which affects much of the global population. While for many, reliable sources of potable water are available from wells, or municipal water sources, much of the world still depends upon unreliable sources for their potable water. Such unreliable sources of potable water may vary in quality and consistency and often are the causes of diseases or epidemics which are of course desirably to be avoided.

While various technologies are known for the purification of water in order to render it potable and safe for human consumption, certain of these require expensive equipment or large processing plants which limits their use to a fixed location which requires that the treated water, now made potable, be further transmitted to the ultimate consumer which may introduce undesired impurities to the water prior to its receipt. Other known art technologies are adapted to point-of-use, that is to say are readily portable and may be installed and moved freely, however many of such systems require the presence of a reliable electrical power source which may not be available reliably or at all. Still other known art technologies are portable and require no electrical power source. This class of technologies frequently utilizes one or more filters, which may be used further in conjunction with one or more chemical compositions which are used to treat water in order to render it potable. Also known are the use of chemical compositions which are used directly in the treatment of a volume of water, such as a volume of water in a container, e.g, bucket, basin, pitcher, which treatment is accomplished by supplying a tablet directly to the volume of water which causes the dissolution of the tablet and the elution of one or more chemical compounds to the water directly, which is intended to render it potable.

Such known art technologies, and known art devices are however not without shortcomings which defeat or dissuade their utility. For example, devices based on filtration alone may not effectively treat microorganisms which are sufficiently small to pass through the filter media and remain active. Technologies based on providing a powder, tablet or cake of one or more chemical compositions which are used directly in the treatment of a volume of water often are not wholly effective and frequently have an undesired residual taste which dissuades their use, even though the treated water is potable and completely safe for human consumption and use.

The various features of the invention address these technical shortcomings, although it is to be understood that certain features of the invention and its general principles of operation may be adapted for use in other technical fields and for other uses as well, although such are not necessarily specifically recited herein.

In a first aspect the present invention is directed to an improved dispenser for a tablet which is useful in releasing one or more chemical compositions via dissolution of the tablet when contacted with water useful in treating the water, particularly to provide a cleaning and/or sanitizing composition to the water.

In a second aspect of the invention there is provided an improved dispenser according to the first aspect of the invention wherein the tablet is used to provide a sanitizing composition from the tablet to the water.

In a third aspect of the invention there is provided an improved dispenser according to the first aspect of the invention wherein the tablet is used to provide a cleaning composition from the tablet to the water.

According to a fourth aspect of the invention there is provided a water treatment device which includes in its construction an improved dispenser for a tablet which is useful in eluting one or more chemical compositions via dissolution of the tablet when contacted with water useful in treating the water.

According to a fifth aspect of the invention there is provided a water treatment device according to the fourth aspect of the invention which is particularly adapted to treat a quantity of water and to render it potable.

According to a sixth aspect of the invention there is provided a point of use water treatment device according to the fifth aspect of the invention.

According to a seventh aspect of the invention there is provided a process for treating a supply of water which process contemplates the steps of:

supplying a tablet which is dissolvable in water and which, during dissolution elutes one or more chemical compounds to the water directly to the improved dispenser for the tablet, supplying a quantity of water to the improved device for the tablet in order to cause the dissolution of the tablet within the improved dispenser.

According to an eighth aspect of the invention there is provided a process according to the seventh aspect of the invention wherein the one or more chemical compounds eluted to the water render it potable.

According to a ninth aspect of the invention there is provided a process according to the eighth aspect of the invention wherein the one or more chemical compounds eluted to the water render it useful as a cleaning composition, e.g, to form a cleaning composition.

According to an tenth aspect of the of the invention, the improved dispenser is utilized to elute or provide one or more chemical compositions to a stream of a liquid, e.g., water, solvent such as one or more organic solvents such as alcohols or glycols, as well as solvents based on blends or mixtures of water with one or more organic solvents, e.g., water/alcohol mixtures.

According to a eleventh aspect of the invention there is provides a process stream which includes within said stream an improved dispenser is utilized to elute or provide one or more chemical compositions to a stream of a liquid, e.g., water, solvent such as one or more organic solvents such as alcohols or glycols, as well as solvents based on blends or mixtures of water with one or more organic solvents, e.g., water/alcohol mixtures.

According to a twelfth aspect of the invention there is provided an article, apparatus or a device which includes an improved dispenser is utilized to elute or provide one or more chemical compositions to a stream of a liquid, e.g., water, solvent such as one or more organic solvents such as alcohols or glycols, as well as solvents based on blends or mixtures of water with one or more organic solvents, e.g., water/alcohol mixtures.

According to a thirteenth aspect of the invention there is provided an article, apparatus or a device which is selected from a dishwashing apparatus, dishware washing machine, clothes washing apparatus, or lavatory appliance such as a toilet, which includes in its construction an improved dispenser is utilized to elute or provide one or more chemical compositions to a stream of a liquid, e.g., water, solvent such as one or more organic solvents such as alcohols or glycols, as well as solvents based on blends or mixtures of water with one or more organic solvents, e.g., water/alcohol mixtures.

According to a fourteenth aspect of the invention there is provided an article, apparatus or a device wherein the improved dispenser is refillable.

According to a fifteenth aspect of the invention there is provided an article, apparatus or a device which is selected from a dishwashing apparatus, dishware washing machine, clothes washing apparatus which includes in its construction an improved dispenser is utilized to elute or provide one or more chemical compositions to a stream of a liquid, e.g., water, solvent such as one or more organic solvents such as alcohols or glycols, as well as solvents based on blends or mixtures of water with one or more organic solvents, e.g., water/alcohol mixtures, or aqueous liquors and/or aqueous/organic liquors containing further constituents wherein the improved dispenser is a removable element, article or assembly which may be removed from said article, apparatus or a device.

According to a sixteenth aspect of the invention there is provided an article, apparatus or a device wherein the improved dispenser is refillable.

According to a seventeenth aspect of the invention there is provided an article, apparatus or a device wherein the improved dispenser is a non-refillable improved dispenser.

According to an eighteenth aspect of the invention there is provided a process for eluting or providing one or more chemical compositions to a liquid, e.g., water, within an article, apparatus or device, especially an apparatus selected from a dishwashing apparatus, dishware washing machine, clothes washing apparatus, or lavatory appliance such as a toilet which process contemplates the step of:

supplying a tablet which is dissolvable in water or other liquid and which, during dissolution elutes one or more chemical compounds to liquid passing through an improved dispenser containing said tablet;

supplying a quantity of liquid within the article, apparatus or device to the improved dispenser for the tablet in order to cause the dissolution of the tablet said improved dispenser, and thereafter, supplying the chemical composition in the liquid to the article, apparatus or device.

The improved dispensers of the invention are advantageously used to deliver quantities of a soluble or dispersible chemical composition, e.g, one or more chemical compounds from a mass of a material containing the soluble chemical composition to quantity of a liquid contained within the improved dispenser, ideally to a stream or flow of a liquid, e.g., water, one or more organic solvents, or any other liquid stream, e.g., water/alcohol mixtures, or aqueous liquors and/or aqueous/organic liquors containing further constituents passing through the improved dispenser. The mass of material may be virtually of any composition so long as it contains a chemical composition which may be eluted from, solubilized from, or otherwise released or dispersed from the mass to the liquid contacting the mass contained within the improved dispenser. While the said chemical composition is most desirably soluble in the liquid passing through the improved device, it need not be. The mass of material may take any chemical composition, e.g., may be a solid, semi-solid such as a paste or gel, event that of a viscous liquid, but conveniently takes the form of a self-supporting tablet, (which may also be interchangeably referred to as 'blocks' or 'cakes') which may be formed by any of a variety of techniques including known-art techniques.

The mass of material need not be wholly soluble in the liquid but preferably most of the mass of the material (e.g., at least 85% wt, more preferably at least 90% wt, yet more preferably at least 95% wt.) is soluble in the liquid. Ideally the mass of material is substantially soluble, at least 99% wt., more preferably at least 99.5% wt. soluble in the liquid with which it comes into contact which passes through the improved device.

The concentration of the chemical composition present in the mass of material may vary. Preferably however, in applications wherein it is desired that the mass of material be dissolved or dispersed over an interval of time, desirably the concentration of the soluble or dispersible chemical composition comprises at least 25% wt, preferably at least 50% wt, more preferably at least 70% wt, yet more preferably at least 80% wt, still more preferably at least 90% wt, yet still more preferably at least 95% wt and ideally the concentration of the chemical composition present in the mass of material is least 99% wt.

It is of course to be understood that the improved dispenser taught herein may be used to dispense or deliver a wide variety of dissolvable or dispersible chemical compositions and therefore the dimensions and mass of the material, its configuration and morphology and its performance characteristics may vary and should be appropriate to the application to which the improved dispensing device is used.

Conveniently the mass of material used in the improved dispenser is in the form of a tablet. The tablets (which may also be interchangeably referred to as 'blocks' or 'cakes') may be formed by conventional techniques including compression, tabletting, extrusion, and other known art techniques. At least a part of the tablets are dissolvable in water or other liquid which passes through the improved device, and in addition to the soluble chemical composition may include one or more optional constituents such as bulking agents, dissolution control agents, pH control agents, tabletting or extrusion lubricants including stearate compounds, hardening agents, non-oxidizing biocides, encapsulating agents, binders, flocculating agents, chelating agents, corrosion inhibiting agents, and other optional constituents known in the art, necessarily include one or more chemical compounds or chemical compositions which when contacted with a liquid, e.g., water, are eluted into the liquid contained in the dispenser according to the invention.

The mass of material, desirably tablets, may include one or more surfactants. By way of non-limiting examples, the mass of material comprises one or more known art surfactants including anionic, cationic, nonionic, amphoteric and zwitterionic surfactants. Many of these surfactants are useful in providing a cleaning effect; certain of these surfactants such as certain cationic quaternary ammonium compounds also exhibit germicidal efficacy. Desirably the treated liquid containing the eluted chemical composition(s) form a cleaning and/or sanitizing composition. In certain preferred embodiments the tablets comprise a halogen source, or a bleach source.

By way of non-limiting examples, one or more known-art sanitizers may be included as constituents in the mass of material used in improved dispensing device. Such include chemical compositions which may comprise a halogen source, or which may elute one or more halogens, e.g., chlorine and/or bromine ions to water or other liquid contained within the improved dispenser including alkali metal and alkaline earth metal hypochlorites, substituted and un-substituted chlorinated hydantoins, substituted and unsubstituted chlorinated isocyanurates and isocyanuric acids, substituted and unsubstituted chlorinated glycolurils, substituted and unsubstituted chlorinated oxazolidinones and imidazolidinones and like chlorinated substances. When used for such purposes, the elution rate of known-art sanitizers is preferably between 0.0001-200 parts per million ("ppm"), As used herein, "a halogen source" comprises one or more compounds that provides hypohalous acid, HOX or hypohalite ion, OX$^-$ species wherein X is halogen when dissolved in water. The halogen source may comprise any halogen or a combination thereof. Halogen ion such as chlorine and bromine are particularly useful. Preferably, the halogen source comprises chlorine or bromine or a combination thereof. Representative halogen sources include, e.g, trichloroisocyanuric acid (TCCA), dichloroisocyanuric acid (DCCA), monochloroisocyanuric acid, potassium dichloroisocyanuric acid, sodium dichloroisocyanuric acid dihydrate, anhydrous sodium dichloroisocyanuric acid, tribromoisocyanuric acid, dibromoisocyanuric acid, monobromoisocyanuric acid, monobromo-dichlorochloroisocyanuric acid, dibromo-monochloroisocyanuric acid, calcium hypochlorite, lithium hypochlorite, 1,3-dichloro-5,5-dimethylhydantoin (DCDMH), 1,3-dibromo 5,5-dimethylhydantoin, 1-bromo, 3-chloro-5,5-dimethyhydantoin (BCDMH), 1,3-dichloro-5-methyl-5-ethylhydantoin, 1,3-dichloro-5,5-dimethyl-hydantoin, trichloromelamine, tribromomelamine.

The mass of material, especially when in the form of a tablet, may include a halogen source as well as one or more surfactants. Such a composition may be advantageously used in the treatment of a lavatory appliance wherein a cleaning and sanitizing effect is desired.

As a sanitizing agent the there may be used one or more cationic surfactants based on germicidally active quaternary ammonium cationic surfactants. Any cationic surfactant which satisfies these requirements may be used and are considered to be within the scope of the present invention, and mixtures of two or more cationic surface active agents, viz., cationic surfactants may also be used. Cationic surfactants are well known, and useful cationic surfactants may be one or more of those described for example in *McCutcheon's Functional Materials*, Vol. 2, 1998; *Kirk-Othmer, Encyclopedia of Chemical Technology*, 4th Ed., Vol. 23, pp. 481-541 (1997), the contents of which are herein incorporated by reference. These are also described in the respective product specifications and literature available from the suppliers of these cationic surfactants.

Examples of preferred cationic surfactant compositions useful in the practice of the instant invention are those which provide a germicidal effect to the concentrate compositions, and especially preferred are quaternary ammonium compounds and salts thereof, which may be characterized by the general structural formula:

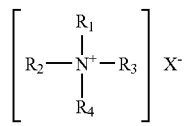

where at least one of $R_1$, $R_2$, $R_3$ and $R_4$ is a alkyl, aryl or alkylaryl substituent of from 6 to 26 carbon atoms, and the entire cation portion of the molecule has a molecular weight of at least 165. The alkyl substituents may be long-chain alkyl, long-chain alkoxyaryl, long-chain alkylaryl, halogen-substituted long-chain alkylaryl, long-chain alkylphenoxyalkyl, arylalkyl, etc. The remaining substituents on the nitrogen atoms other than the abovementioned alkyl substituents are hydrocarbons usually containing no more than 12 carbon atoms. The substituents $R_1$, $R_2$, $R_3$ and $R_4$ may be straight-chained or may be branched, but are preferably straight-chained, and may include one or more amide, ether or ester linkages. The counterion X may be any salt-forming anion which permits water solubility of the quaternary ammonium complex.

Exemplary quaternary ammonium salts within the above description include the alkyl ammonium halides such as cetyl trimethyl ammonium bromide, alkyl aryl ammonium halides such as octadecyl dimethyl benzyl ammonium bromide, N-alkyl pyridinium halides such as N-cetyl pyridinium bromide, and the like. Other suitable types of quaternary ammonium salts include those in which the molecule contains either amide, ether or ester linkages such as octyl phenoxy ethoxy ethyl dimethyl benzyl ammonium chloride, N-(laurylcocoaminoformylmethyl)-pyridinium chloride, and the like. Other very effective types of quaternary ammonium compounds which are useful as germicides include those in which the hydrophobic radical is characterized by a substituted aromatic nucleus as in the case of lauryloxyphenyltrimethyl ammonium chloride, cetylaminophenyltrimethyl ammonium methosulfate, dodecylphenyltrimethyl ammonium methosulfate, dodecylbenzyltrimethyl ammonium chloride, chlorinated dodecylbenzyltrimethyl ammonium chloride, and the like.

Preferred quaternary ammonium compounds which act as germicides and which may be found useful in the practice of the present invention include those which have the structural formula:

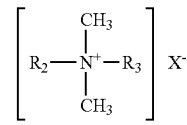

wherein $R_2$ and $R_3$ are the same or different $C_8$-$C_{12}$alkyl, or $R_2$ is $C_{12-16}$alkyl, $C_{8-18}$alkylethoxy, $C_{8-18}$alkylphenolethoxy and $R_3$ is benzyl, and X is a halide, for example chloride, bromide or iodide, or is a methosulfate anion. The alkyl groups recited in $R_2$ and $R_3$ may be straight-chained or branched, but are preferably substantially linear.

Particularly useful quaternary germicides include compositions which include a single quaternary compound, as well as mixtures of two or more different quaternary compounds. Such useful quaternary compounds are available under the BARDAC®, BARQUAT®, HYAMINE®, LONZABAC®, and ONYXIDE® trademarks.

Further sanitizing agents which may be used include one or more antimicrobial agents including: pyrithiones (especially zinc pyrithione which is also known as ZPT), dimethyldimethylol hydantoin (Glydant®), methylchloroisothiazolinone/methylisothiazolinone (Kathon CG®), sodium sulfite, sodium bisulfite, imidazolidinyl urea (Germall 115®), diazolidinyl urea (Germaill II®), benzyl alcohol, 2-bromo-2-nitropropane-1,3-diol (Bronopol®), formalin (formaldehyde), iodopropenyl butylcarbamate (Polyphase P100®), chloroacetamide, methanamine, methyldibromonitrile glutaronitrile (1,2-Dibromo-2,4-dicyanobutane or Tektamer®), glutaraldehyde, 5-bromo-5-nitro-1,3-dioxane (Bronidox®), phenethyl alcohol, o-phenylphenol/sodium o-phenylphenol, sodium hydroxymethylglycinate (Suttocide A®), polymethoxy bicyclic oxazolidine (Nuosept C®), dimethoxane, thimersal dichlorobenzyl alcohol, captan, chlrphenenesin, dichlorophene, chlorbutanol, glyceryl laurate, halogenated diphenyl ethers like 2,4,4'-trichloro-2'-hydroxy-diphenyl ether (Triclosan® or TCS), 2,2'-dihydroxy-5,5'-dibromo-diphenyl ether, phenolic compounds like phenol, 2-methyl phenol, 3-methyl phenol, 4-methyl phenol, 4-ethyl phenol, 2,4-dimethyl phenol, 2,5-dimethyl phenol, 3,4-dimethyl phenol, 2,6-dimethyl phenol, 4-n-propyl phenol, 4-n-butyl phenol, 4-n-amyl phenol, 4-tert-amyl phenol, 4-n-hexyl phenol, 4-n-heptyl phenol, mono- and poly-alkyl and aromatic halophenols such as p-chlorophenol, methyl p-chlorophenol, ethyl p-chlorophenol, n-propyl p-chlorophenol, n-butyl p-chlorophenol, n-amyl p-chlorophenol, sec-amyl p-chlorophenol, n-hexyl p-chlorophenol, cyclohexyl p-chlorophenol, n-heptyl p-chlorophenol, n-octyl p-chlorophenol, o-chlorophenol, methyl o-chlorophenol, ethyl o-chlorophenol, n-propyl o-chlorophenol, n-butyl o-chlorophenol, n-amyl o-chlorophenol, tert-amyl o-chlorophenol, n-hexyl o-chlorophenol, n-heptyl o-chlorophenol, o-benzyl p-chlorophenol, o-benzyl-m-methyl p-chlorophenol, o-benzyl-m,m-dimethyl p-chlorophenol, o-phenyletliyl p-chlorophenol, o-phenylethyl-m-methyl p-chlorophenol, 3-methyl p-chlorophenol, 3,5-dimethyl p-chlorophenol, 6-ethyl-3-methyl p-chlorophenol, 6-n-propyl-3-methyl p-chlorophenol, 6-iso-propyl-3-methyl p-chlorophenol, 2-ethyl-3,5-dimethyl p-chlorophenol, 6-sec-butyl-3-methyl p-chlorophenol, 2-iso-propyl-3,5-dimethyl p-chlorophenol, 6-diethylmethyl-3-methyl p-chlorophenol, 6-iso-propyl-2-ethyl-3-methyl p-chlorophenol, 2-sec-amyl-3,5-dimethyl p-chlorophenol 2-diethylmethyl-3,5-dimethyl p-chlorophenol, 6-sec-octyl-3-methyl p-chlorophenol, p-chloro-m-cresol, p-bromophenol, methyl p-bromophenol, ethyl p-bromophenol, n-propyl p-bromophenol, n-butyl p-bromophenol, n-amyl p-bromophenol, sec-amyl p-bromophenol, n-hexyl p-bromophenol, cyclohexyl p-bromophenol, o-bromophenol, tert-amyl o-bromophenol, n-hexyl o-bromophenol, n-propyl-m,m-dimethyl o-bromophenol, 2-phenyl phenol, 4-chloro-2-methyl phenol, 4-chloro-3-methyl phenol, 4-chloro-3,5-dimethyl phenol, 2,4-dichloro-3,5-dimethylphenol, 3,4,5,6-terabromo-2-methylphenol, 5-methyl-2-pentylphenol, 4-isopropyl-3-methylphenol, para-chloro-meta-xylenol, dichloro meta xylenol, chlorothymol, 5-chloro-2-hydroxy-diphenylmethane, resorcinol and its derivatives including methyl resorcinol, ethyl resorcinol, n-propyl resorcinol, n-butyl resorcinol, n-amyl resorcinol, n-hexyl resorcinol, n-heptyl resorcinol, n-octyl resorcinol, n-nonyl resorcinol, phenyl resorcinol, benzyl resorcinol, phenylethyl resorcinol, phenylpropyl resorcinol, p-chlorobenzyl resorcinol, 5-chloro 2,4-dihydroxydiphenyl methane, 4'-chloro 2,4-dihydroxydiphenyl methane, 5-bromo 2,4-dihydroxydiphenyl methane, and 4'-bromo 2,4-dihydroxydiphenyl methane, bisphenolic compounds like 2,2'-methylene bis (4-chlorophenol), 2,2'-methylene bis (3,4,6-trichlorophenol), 2,2'-methylene bis (4-chloro-6-bromophenol), bis (2-hydroxy-3,5-dichlorophenyl)sulphide, and bis (2-hydroxy-5-chlorobenzyl)sulphide, benzoic esters(parabens) like methylparaben, propylparaben, butylparaben, ethylparaben, isopropylparaben, isobutylparaben, benzylparaben, sodium methylparaben, and sodium propylparaben, halogenated carbanilides (e.g., 3,4,4'-trichlorocarbanilides (Triclocarban® or TCC), 3-trifluoromethyl-4,4'-dichlorocarbanilide, 3,3',4-trichlorocarbanilide, as well as 2,4-dichloro-3,5-m-xylenol ("DCMX"). The phenol based non-cationic antimicrobials are preferred, of which parachlorometacresol ("PCMC") and especially parachlorometaxylenol ("PCMX") is particularly preferred for use in the inventive compositions.

Yet further sanitizing agents which may be used include so-called "natural" antibacterial actives, referred to as natural essential oils. These actives derive their names from their natural occurrence in plants. Typical natural essential oil antibacterial actives include oils of anise, lemon, orange, rosemary, wintergreen, thyme, lavender, cloves, hops, tea tree, citronella, wheat, barley, lemongrass, cedar leaf, cedarwood, cinnamon, fleagrass, geranium, sandalwood, violet, cranberry, eucalyptus, vervain, peppermint, gum benzoin, basil, fennel, fir, balsam, menthol, ocmea origanum, Hydastis carradensis, Berberidaceae daceae, Ratanhiae and *Curcuma longa*. Also included in this class of natural essential oils are the key chemical components of the plant oils which have been found to provide the antimicrobial benefit. These chemicals include, but are not limited to anethol, catechole, camphene, carvacol, eugenol, eucalyptol, ferulic acid, farnesol, hinokitiol, tropolone, limonene, menthol, methyl salicylate, thymol, terpineol, verbenone, berberine, ratanhiae extract, caryophellene oxide, citronellic acid, curcumin, nerolidol and geraniol.

Still further sanitizing agents which may be used include antibacterial metal salts. This class generally includes salts of metals in groups 3b-7b, 8 and 3a-5a. Specifically are the salts of aluminum, zirconium, zinc, silver, gold, copper, lanthanum, tin, mercury, bismuth, selenium, strontium, scandium, yttrium, cerium, praseodymiun, neodymium, promethum, samariurn, europium, gadolinium, terbium, dysprosium, holmium, erbium, thulium, ytterbium, lutetium and mixtures thereof.

The mass of material may include further soluble chemical compositions to the liquid passing through an improved dispenser. By way of non-limiting examples, such further soluble chemical compositions include salts of inorganic or organic compounds, e.g., mineral salts, pH control agents including inorganic and organic acids particularly in the form of water soluble or water dispersible salts, dyestuffs, colorants, enzymes, pH buffers, necessarily include one or more chemical compounds or chemical compositions which when contacted with a liquid, e.g., water, are eluted into the liquid contained in the dispenser according to the invention are released into said liquid.

It is to be understood that the improved dispenser may be used to dispense a dispersible chemical composition which may be dispersed into the liquid contained in or passing through the improved dispenser without however needing to be soluble within said liquid. In such applications is it contemplate that the mass of material comprises at least one material which is soluble in a liquid passing through the dispenser, said material which is a carrier for the chemical composition which may be dispersed into the liquid. For example, the chemical composition may be a pharmaceutically active material such as a medical composition or medicament which is not necessarily soluble in water or other liquid but which may be dispersed in to said water or other liquid. As a further example the chemical composition may be an enzyme which is not necessarily soluble in water or other liquid but which may be dispersed in to said water or other liquid which is present in the dispenser. As a yet further example the chemical composition may be an encapsulated or microencapsulated chemical composition which is not necessarily soluble in water or other liquid present in the device. With the use of such materials it is contemplated that the insoluble chemical composition forms part of the mass of material, wherein part of the mass includes a soluble material is soluble in the liquid or water present in the dispensing device which when dissolved or dispersed therein releases the soluble material which in turn allows the insoluble chemical composition be dispersed into the water or other liquid present in the dispenser. As such it is understood that the soluble material acts as a carrier for the insoluble chemical composition in the mass, e.g., tablet.

Certain aspects of the invention and certain presently preferred embodiments of the invention are described with reference to the following figures.

FIGS. 1, 2 and 3 illustrate the mode of operation of a preferred embodiment of a refillable dispenser 20 of the invention under different flow conditions used in an application wherein water is contacted with a tablet which elutes a halogen to water passing through the device.

FIG. 1 depicts in a cross-sectional view the operation of the dispenser 20 under a "normal" flow condition. Filtered untreated water passes through the filter media 32, and through the filter 30 and exits via outlet 38 of the threaded nipple 36 whence it falls into a weir 23 defined by a first sidewall 23A and a second, sloped sidewall 23B spaced therefrom, which slopes toward the first sidewall 23A. Part of the lower end of the sloped sidewall 23B may be conjoined to a part of the first sidewall 23A, but a bottom weir exit 23F is provided. The upper end of the sloped sidewall 23B crests to a crest 23C and then slopes downwardly in a direction away from the first sidewall 23A and defines a sloped face 23D which terminates at an edge 23E. The weir exit 23F of the weir 23 is formed by at least one discontinuity between the first sidewall 23A and the second, sloped sidewall 23B. The weir exit 23F is in fluid communication with a trough 26 beneath the weir 23 and which is defined by a trough wall having a flat section 26A extending from the chute 25 within which the tablet 40 is positioned. The trough wall extends upwardly via a sloped section 26B which extends sufficiently upwardly and crests above the level of the weir exit 23F, which sloped section 26B extends to a crest 26C and reverses direction to slope away via a sloped face 26D to terminate at a trough edge 26E. As is visible in FIG. 1, the lower section of the chute 25, the trough 26 and the weir 23 are in fluid communication with one another. As is also visible, the edge 23E extends over and beyond the edge 26E of the trough 26 such that any water flowing downwardly over the sloped face 23D falls over the edge 23E and does not enter the trough 26. Preferably any water flowing downwardly over the sloped face 23D falls into the outlet 24.

The trough wall 26 also includes a drain 28 for water contained in the trough 26, and permits for fluid to pass into a chamber 29 beneath the trough wall 26A, and then outwardly from the dispenser 20 via outlet 24.

It is to be understood that the filter media 32, filter 30, threaded nipple 36 and outlet 38 do not form part of the dispenser 20 of the invention but are merely illustrated and described for sake of convenience in describing the operation of the dispenser 20.

In use, and under "normal" flow conditions filtered untreated water exiting the filter 30 falls into the weir 23 wherein it collects and overfills the weir 23. Water overfilling the weir 23 falls downwardly over the sloped face 23D (fluid stream in the direction of arrow "E") falls over the edge 23E and exits the dispenser 20 through the outlet 24. In such manner the maximum capacity of the weir 23 is maintained, generating a pressure head of water. The water contained in the weir 23 flows downwardly and out from the weir 23 via the weir exit 23F wherein it fills up the trough 26. Water continues to fill the trough 26 which concurrently causes the water to contact the tablet 40 which slowly dissolves it and releases one or more chemical compositions to the water in the trough 26. When sufficient water is present in the trough 26, it rises above the sloped section 26B and the crest 26C where overflows over the crest 26C and spills over (fluid stream in the direction of arrow "F") the downwardly sloped section 26D and beyond the edge 26E and out of the dispenser 20 via its outlet 24, where it intermingles with the other fluid streams exiting the dispenser 20. Simultaneously a part of the water contained in the trough 26 also drains downwardly out of the drain 28 of the trough 26 and into the chamber 29 beneath the trough wall 26A, (fluid stream in the direction of arrow "G") and then outwardly from the dispenser 20 via outlet 24. The fluid streams (F, G) exiting the trough via the drain 28 and via overflow over the crest 26C comprise the chemical composition(s) eluted from the tablet 40, while the fluid stream (E) overfilling the weir 23 and falling downwardly over the sloped face 23D does not. It will be understood then that under normal flow conditions, the total volumetric passing out of the dispenser via outlet 24 is the sum total volumetric flowrates of each of fluid streams E, F and G. Under normal flow conditions, the flowrate of fluid stream E is greater than zero, but is preferably greater than zero.

An advantageous feature of the invention is now discussed with reference to the conditions of the fluid streams E, F and G. Under normal flow conditions the volumetric flowrate of fluid stream G is greater than zero, but is preferably greater. However the volumetric flowrate of fluid streams E and F which contain the eluted chemical composition is essentially constant under these flow conditions as the only inlet is that provided by water flowing downward through the weir 23, through the weir exit 23F and into the trough 26 where it ultimately necessarily exits via either the drain 28 (fluid stream G) or by rising above the sloped section 26B overflowing the crest 26C and spilling over the downwardly sloped section 26D and beyond the edge 26E (fluid stream F). Such provides an essentially constant delivery rate of the eluted chemical composition(s) in fluid streams F and G within the device, and when the volumetric flowrate of fluid stream E is zero, only fluid streams F and G exit the dispenser 20 via the exit 24. However, any increase in the volumetric flowrate of the fluid stream E merely overfills the weir 23 overflowing it, and excess water tumbles downward to intermix with the fluid streams F and G containing the eluted chemical composition(s) which they contain, diluting the concentration of the chemical composition(s) exiting the dispenser 20. Thus, any increase in the volumetric flowrate entering the dispenser 20 so that the flowrate of E is in excess of zero provides a means to proportionately control of the ultimate concentration of the eluted chemical composition(s) exiting the dispenser 20 as the greater the volumetric flowrate of stream E, the greater the amount of water intermixed with the fluid streams F and G, whose volumetric flowrates being essentially constant, are proportionately diluted to a greater degree.

Such a feature offers certain surprising benefits. First, presuming that the elution rate of the chemical composition(s) into water are essentially constant, under normal flow conditions the maximum concentration of the eluted chemical composition(s) exiting the dispenser 20 is the delivery rate of the eluted chemical composition(s) of fluid streams F and G, as may be further diluted by the fluid stream E. When the volumetric flowrate of fluid stream E is zero, the maximum delivery rate of the eluted chemical composition(s) exiting the dispenser 20 occurs. This can be readily measured and if it exceeds a target or threshold amount such as may pertain to a specific use of the dispenser 20, or a system or device utilizing the dispenser 20, one or more various modifications may be made in order to alter the delivery characteristics of the dispenser 20. One such modification is in altering the properties and/or composition of the tablet 40, e.g., dissolution rate of chemical composition(s), tablet composition, etc., so that under the desired normal flow conditions the tablet elutes the chemical composition(s) at or below a desired elution rate. Other modifications which are contemplated may require alternations of the configuration of the dispenser itself. Alternation of the volumetric capacity or either the weir 26, the trough 26 or both may be used to adjust the volumetric flowrate of water which comes into contact with the tablet 40. Alternately, on in conjunction with any of these other changes, modifying the size of the weir exit 25 and/or the drain 28 as well as the number of these elements also influence the volumetric flowrate of water which comes into contact with the tablet 40. Thus, a great degree of control over the maximum delivery of the eluted chemical composition(s) exiting the dispenser 20 can be established. Such is a particularly useful feature as it may also function as a fail-safe mechanism, ensuring that a maximum delivery rate of the eluted chemical composition(s) exiting the dispenser 20 does not occur. Second, the operation of the dispenser 20 further provides for controlled delivery of the eluted chemical composition(s) exiting the dispenser 20 as well. As the maximum delivery rate of the eluted chemical composition(s) of fluid streams F and G is essentially constant, these streams may be controllably further diluted by limiting or controlling the volumetric flowrate of fluid stream E by altering the inlet rate of the filtered water entering the dispenser 20. Once normal flow conditions occur, any increase in the volumetric inlet rate of filtered untreated water forms fluid stream E, which upon exiting the dispenser 20 dilute fluid streams F and G and act to decrease the net concentration of the eluted chemical composition(s) of fluid streams F and G. Thus, with proper sizing of the respective dimensions of the elements of the dispenser 20, and with the provision of a tablet or block 40 having suitable properties and/or composition, the maximum delivery rate of the eluted chemical composition(s) exiting the dispenser 20 does not occur; it remains at a maximum when the volumetric flowrate of stream E is zero, but can only decrease as the volumetric flowrate of stream E increases, which proportionally dilutes fluid streams F and G as the combined streams exit the dispenser 24.

FIG. 2 illustrates in a cross-sectional view the operation of the dispenser 20 during "initial underflow" operating conditions, when flow of water entering the dispenser 20 initially ceases. As is visible from the figure, the uppermost water level in the weir 23 is beneath that of the topmost point of the weir 23, namely the crest 23C and thus the there is no fluid stream E, viz., the volumetric flowrate of E is equal to zero. The water in the weir 23 flows downwardly into the trough 26, wherein it contacts the tablet 40 and aids in its dissolution and release of chemical composition(s) into the water, and thereafter drains out over the crest 26C, and via the drain 28, into the chamber 29 and out of the dispenser 20 via the exit 24. Under such initial subnormal operating conditions, the water in the trough 26 may rather quickly drain out of the dispenser 20, which feature aids in extending the service life of the tablet 40 which is not further immersed in water.

FIG. 3 illustrates in a cross-sectional view the operation of the dispenser 20 in a "final underflow" operating condition which may occur when filtered untreated water entering the dispenser 20 is no longer present in the weir 23 and is insufficient to fill the trough 26. When this condition occurs, any water contained in the trough 26 drains through the drain 28 permitting it to seep into the bottom chamber 29 beneath the trough wall 26A. Thereafter this water ultimately exits the dispenser 20 out the outlet 24. In this manner, maximum utilization of the tablet 40 is assured, even (as illustrated) when the tablet 40 crumbles or fractures into parts.

When a tablet is consumed, a new tablet is conveniently inserted through the open end of the chute 25 of the device 20 by a consumer. The new tablet needs only be dropped into or otherwise inserted into the top part of the chute region 25 of the dispenser 20 wherein it will should fall and contact with the trough 26. While not shown in any of FIGS. 1-3, the open end of the chute 25 may include a removable cover or cap, or may include a fixed cover or cap which may be deformed in order to permit for the insertion of a new tablet. With respect to the latter, the use of a cap or cover formed of an elastomeric material (e.g., rubber) having a slit formed therein which is normally closed is contemplated. A new tablet may be inserted through the slit which deforms and separates the slit and into the chute; upon full insertion of the tablet the slit snaps back into its non-deformed state, once again sealing the open end of the chute. With respect to the former, a removable cap or plug which is temporarily removed from the open end of the chute 25 is also contemplated to be both simple and useful.

As will be realized from a review of the foregoing figures, the design of the dispenser 20 skillfully addresses and overcomes a number of technical shortcomings known to the art. The dispenser 20 ensures effective dissolution of a tablet and delivery of the chemical composition eluted from the tablet to a point downstream of the dispenser 20 even under varying water flow conditions. Such a dispenser 20 finds use in other applications and technical areas as well.

It is to be understood that the improved dispenser need not be supplied via a filter as is illustrated in the figures, but rather any supply of a liquid, e.g., water or other liquid may be supplied directly to the improved dispenser and into the weir 23. It is also to be understood that the improved dispenser may be used in other devices than those specifically illustrated, and while not depicted may be used to dispense a chemical composition(s) in a form other than a tablet or block, e.g., gel or liquid.

The tablets and blocks useful in releasing one or more chemical compositions and which is useful with the dispenser 20 may be of any configuration or geometry; e.g., including but not limited to circular tablets, spheres, elliptical or oval shaped tablets, square, rectangular, parallelogram as well as cube shaped and brick shaped tablets. Also useful as tablets or blocks useful with the present inventions are configurations such as rods and rectangular plates which are at least twice as long as they are wide. Preferred for use as the tablets and blocks of the invention are tablets and blocks which have a generally uniform cross-sectional area which is immersed in the liquid, e.g., water contained in the trough. Such are preferred as, during the slow dissolution of the block or tablet a relatively constant volume of the tablet or block is immersed in the water thus ensuring a relatively uniform delivery rate of the one or more chemical compositions to the liquid during the useful life of the tablet or block. A further preferred form of tablets or blocks which find use with the dispenser are those which includes smooth exterior surfaces especially tables or blocks which are spherical, or flattened spherical in shape. Such shapes, particularly those of spherical shape or flattened spherical shape have several benefits. They provide no sharp edges or surfaces which may jam into the chute and defeat a proper installation in the chute of the dispenser, and the surface of a sphere or flattened spherical shape presents a minimum flat surface which may lay upon, or adhere to any of the inner walls of the chute and diminish its dissolution into the water of the trough. The configuration of the chute 25 may be reconfigured as may be necessary in order to accommodate a tablet or block of a desired configuration.

The shape of the tablet block or composition may also be used to provide an anti-counterfeiting feature to the dispenser 20, as is discussed with reference to FIGS. 4A and 4B.

FIG. 4A depicts in a cross-sectional view a dispenser according to the invention which further includes a tablet drawer adapted to be inserted within the chute of the dispenser. The tablet drawer 50 is in the form of plate having two pins 52A, 52B extending outwardly from opposites sides of the plate at a proximate end of the tablet drawer. Each of the pins is in sliding engagement within a corresponding guide slot 25A formed in opposite interior sidewalls of the chute 25. The tablet drawer also includes at the proximate end 54 thereof a recess or aperture 55 which extends into or extends through (as appropriate) the tablet drawer and is dimensioned to receive a tablet or block 40 only of a matching geometric configuration. At the distal end the tablet drawer may conveniently include a grip section 56, and a peripheral skirt-plate 57 which is dimensioned to form a cover for the open end 25E of the chute. The grip section is desirably configured to include one or more raised ribs 56A to facilitate grasping by a user of the dispenser.

In use, the tablet drawer is easily withdrawn and extended outwardly from the chute being guided by the pins in their corresponding guide slots 25A, (25B is not visible) and raised to the position shown in FIG. 4A. This position provides access to the recess or aperture. A properly configured tablet or block is then inserted into the recess or aperture, and then the tablet drawer is pushed downwardly to deliver the tablet or block at least partially into the trough 26. When present the peripheral skirt-plate covers the open end of the chute so to minimize the likelihood of contamination of the interior of the dispenser 20 by extraneous environmental materials.

Figure 4B:
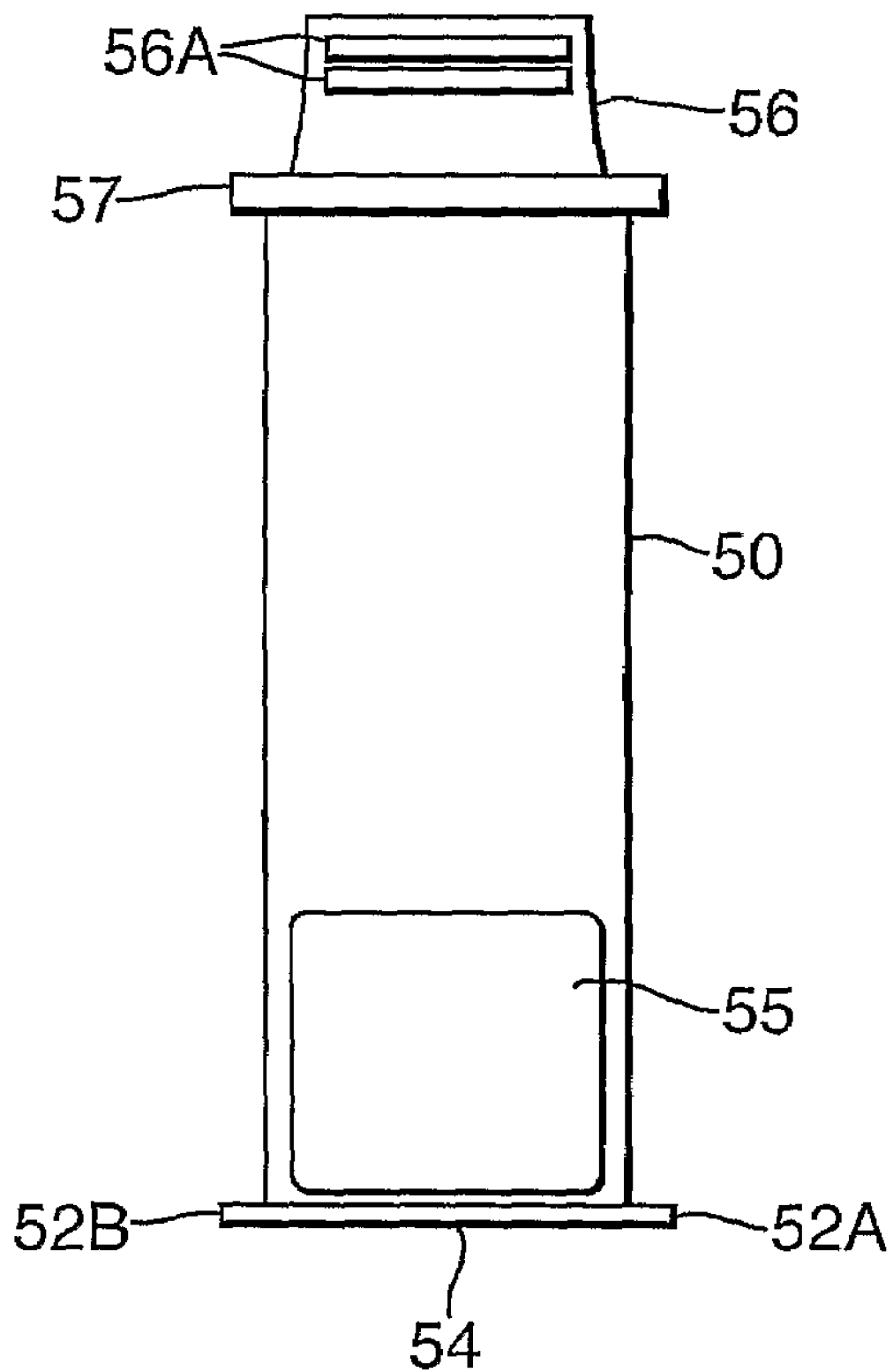

FIG. 4B illustrates in a plan view the tablet drawer 50, including the preferred arrangement and relative positioning of the various elements thereof. Although the aperture 55 depicted is of a generally square configuration it is to be understood that other geometrical configurations may be used instead. Additionally although two pins are shown, the use of such pins and of corresponding guide slots in the dispenser can be eliminated.

While the dispenser 20 may be made of any material, the use of non-porous materials such as glass or ceramics, or thermosettable or thermoformable synthetic polymers such as are widely used in casting or injection molding may be used. Preferably at least the chute 25 of the dispenser 20 is formed of a transparent material, such as a transparent polymer so that the consumer is visually apprised of the presence of or absence of the tablet. Absence of the tablet provides a visual indicator to the user that the dispenser 20 needs to be resupplied with a new tablet or block.

The chute of the dispenser 25 may also include other visual indicators or marks, such as lines or notches which are intended to provide approximate calibration marks as to the expected remaining life of a tablet or block present in the chute 25. Such may be any of a set of symbols or marker, e.g., major and minor graduation lines or line segments, a series of evenly vertically spaced marks such as lines or dots, or a numerical indicator or series of numbers such as on a vertical scale. While such are not expected to be consistently empirically accurate, they may be useful to provide an approximation of the remaining service life of the tablet present in the chute 25, particular when the chute 25 is made of a transparent or translucent material.

Whereas the embodiment of the dispenser depicted on FIGS. 1-3, 4A and 4B illustrate a dispenser which may be refilled with a further table or block on a periodic basis it is contemplated that the dispenser may be produced in non-refillable format, wherein it is intended that any article comprising the dispenser is used once until the tablet is consumed, then the article is withdrawn from use and may be disposed of. In such an embodiment, the chute 25 need not be provided, and/or the opening of the chute 25 of the dispenser may be sealed after introduction of the tablet.

Alternately or in addition thereto, the tablet or block may be provided with one or more visual indicators molded thereinto or impressed thereon, such as a series of evenly vertically spaced marks such as lines or dots, or a numerical indicator or series of numbers such as on a vertical scale. Such may be applied to the exterior of the tablet or block after its manufacture such as by pressing or stamping, or may be applied to the exterior of the tablet during the tablet or block's manufacture. Such a feature is particularly useful with tablets or blocks having a relatively constant cross sectional area in vertical axis as described previously with respect to the blocks and tablets.

The improved dispenser of the invention may be used in a an article, device or apparatus used in a process for eluting or providing one or more chemical compositions to a liquid, e.g., water, within said article, apparatus or device which process contemplates the step of:

supplying a tablet which is dissolvable in water or other liquid and which, during dissolution elutes one or more chemical compounds to liquid passing through an improved dispenser containing said tablet;

supplying a quantity of liquid within the article, apparatus or device to the improved dispenser for the tablet in order to cause the dissolution of the tablet said improved dispenser, and thereafter, supplying the chemical composition in the liquid to the article, apparatus or device.

While the dispenser described herein has been described with reference to its use in a point of use water treatment device, it is to understood that its may be used in other devices and applications. For example it is contemplated that the dispenser described herein may be used for devices useful to deliver one or more chemical compounds to sanitary appliances, e.g., toilets. Such devices which may include a form of the dispenser described herein include so-called in the bowl ("ITB") devices which are usually suspended with the toilet bowl, typically at a locus at or underneath the upper rim from which flush water emanates during a flush cycle, as well as so-called in the cistern ("ITC") devices which are usually inserted in the supply tank for containing water used for flushing the toilet. In such an application the chemical composition(s) used with such a device typically include one or more solid tablets or cakes which are formulated to provide a cleaning, fragrancing and/or sanitizing composition. Such chemical compositions(s) which are gels, pastes, or liquids are also contemplated as being useful in providing cleaning, fragrancing and/or sanitizing compositions as well. Such cleaning, fragrancing and/or sanitizing compositions include known-art constituents which are blended, mixed or otherwise formed into solid, liquid or gel forms for use in such devices.

It is to be clearly understood that the improved dispenser may be used with a dishwashing apparatus or dishware dishware washing machine. For example a dispenser may be provided as either an integral part of the dishwashing apparatus or dishware dishware washing machine and during use the dispenser is periodically resupplied or refilled with a tablet of a suitable composition and during use of the dishwashing apparatus or dishware dishware washing machine at least part of the wash water passes through the dispenser. Alternately a removable device which comprises the dispenser may be used in a dishwashing apparatus or dishware dishware washing machine in a dishwashing process. Such a removable device may be refillable, or of a non-refillable type.

The improved dispenser may also be used in conjunction with or form part of a clothes-washing apparatus as well. For example the dispenser may be provided as either an integral part of the clothes washing apparatus and during use the dispenser is periodically resupplied or refilled with a tablet of a suitable composition and during use of the clothes washing apparatus at least part of the wash water passes through the dispenser. Alternately a removable device which comprises the dispenser may be used in a clothes washing apparatus in a clothes washing process. Such a removable device may be refillable, or of a non-refillable type.

The improved dispenser of the invention may be used in an article, device or apparatus for treating water, as well as in a process for treating a supply of water which process contemplates the steps of:

supplying a tablet which is dissolvable in water and which, during dissolution elutes one or more chemical compounds to the water directly to the improved dispenser for the tablet, supplying a quantity of water to the improved device for the tablet in order to cause the dissolution of the tablet within the improved dispenser, which is used to treat the water. The treated water may be potable water and/or the article, device or apparatus which includes the improved dispenser may be used to render unpotable water, potable following treatment utilizing the improved dispensing device.

Yet other devices which may incorporate the dispenser according to the invention, although not described with particularly within are also considered to be useful and falling into the scope of the invention.

It is to be understood that these examples are provided by way of illustration only and that further useful formulations falling within the scope of the present invention and the claims may be readily produced by one skilled in the art without deviating from the scope and spirit of the invention.

The invention claimed is:

1. An improved dispenser for a tablet releasing one or more chemical compositions when contacted with a liquid present in the dispenser comprising:
   an outlet;
   a weir defined by a first sidewall and a second, sloped sidewall spaced therefrom, a crest at the top of the sloped sidewall slopes downwardly in a direction away from the first sidewall and defines a sloped face which terminates at an edge;
   a bottom weir exit formed by at least one discontinuity between the first sidewall and the second, sloped sidewall which is in fluid communication with a trough beneath the weir;
   said trough defined by a trough wall having a flat section extending from a chute adapted to contain a tablet, a sloped section which extends upwardly and extends to a crest and reverses direction to slope away via a sloped face to terminate at a trough edge, wherein the lower section of the chute, the trough and the weir are in fluid communication with one another, and wherein edge extends beyond the edge of the trough; and wherein the trough wall also includes a drain for liquid contained in the trough.

2. An improved dispenser for a tablet according to claim 1 wherein the dispenser further comprises a chamber beneath the trough wall in fluid communication with the trough via drain as well as in fluid communication with the outlet.

3. An article comprising the improved dispenser according to claim 1 wherein the dispenser is refillable.

4. An article comprising the improved dispenser according to claim 1 wherein the dispenser is non-refillable.

5. A liquid treatment device which includes in its construction an improved dispenser for a tablet according to claim 1 useful in eluting one or more chemical compositions via dissolution of the tablet when contacted with liquid useful in treating the liquid.

6. A process for treating a supply of a liquid which process comprises the steps of:
   supplying a tablet which is dissolvable in water or other liquid and which, during dissolution elutes one or more chemical compounds to liquid passing through an improved dispenser according to claim 1 containing said tablet;
   supplying a quantity of liquid within the article, apparatus or device to the improved dispenser for the tablet in order to cause the dissolution of the tablet said improved dispenser.

7. A process for providing one or more chemical compositions to a liquid within an article, apparatus or device which process includes the step of:
   supplying a tablet which is dissolvable in a liquid and which, during dissolution elutes one or more chemical compounds to said liquid passing through an improved dispenser according to claim 1 containing said tablet;
   supplying a quantity of liquid within the article, apparatus or device to the improved dispenser for the tablet in order to cause the dissolution of the tablet within said improved dispenser.

8. A process according to claim 7 for providing one or more chemical compositions to a liquid, wherein the article, apparatus or device is selected from a dishwashing apparatus, dishware washing machine, clothes washing apparatus, or a lavatory appliance.

* * * * *